US008195803B2

(12) United States Patent
Zhang et al.

(10) Patent No.: US 8,195,803 B2
(45) Date of Patent: Jun. 5, 2012

(54) METHOD AND APPARATUS FOR MODELING AND MANAGING QUALITY OF SERVICE (QOS) IN A SERVICE-ORIENTED ARCHITECTURE (SOA) ENVIRONMENT

(75) Inventors: Liang-Jie Zhang, Cortlandt Manor, NY (US); Jia Zhang, DeKalb, IL (US)

(73) Assignee: International Business Machines Corporation, Armonk, NY (US)

( * ) Notice: Subject to any disclaimer, the term of this patent is extended or adjusted under 35 U.S.C. 154(b) by 1072 days.

(21) Appl. No.: 11/956,741

(22) Filed: Dec. 14, 2007

(65) Prior Publication Data

US 2009/0158240 A1 Jun. 18, 2009

(51) Int. Cl.
*G06F 15/173* (2006.01)
(52) U.S. Cl. .......................... 709/226; 717/104; 370/351
(58) Field of Classification Search .................. 709/226; 717/104; 370/351
See application file for complete search history.

(56) References Cited

U.S. PATENT DOCUMENTS

| 7,814,226 | B2* | 10/2010 | Patrick .......................... 709/238 |
| 2005/0223109 | A1* | 10/2005 | Mamou et al. ................ 709/232 |
| 2006/0047742 | A1* | 3/2006 | O'Neill et al. ................ 709/203 |
| 2006/0069995 | A1* | 3/2006 | Thompson et al. ........... 715/700 |
| 2007/0011126 | A1* | 1/2007 | Conner et al. ................. 706/47 |
| 2007/0105589 | A1* | 5/2007 | Lu .............................. 455/556.2 |
| 2007/0143474 | A1* | 6/2007 | Sheng et al. .................. 709/224 |
| 2008/0069124 | A1* | 3/2008 | Patrick .......................... 370/401 |
| 2008/0082569 | A1* | 4/2008 | Mansour et al. ............. 707/102 |

OTHER PUBLICATIONS

Liang-Jie Zhang et al.; "Requirements Driven Dynamic Services Composition for Web Services and Grid Solutions;" Journal of Grid Computing 2; 2004; 121-140.
Liang-Jie Zhang et al.; "Web Services Relationships Binding for Dynamic e-Business Integration," International Conference on Internet Computing (IC'02), pp. 561-567, Jun. 2002.
Jia Zhang et al.; "Web Services Quality Testing", International Journal of Web Services Research, Apr.-Jun. 2005, 2(2), pp. 1-4.
John Y. Sayah et al.; "On-demand business collaboration enablement with web services;" Decision Support Systems 40; 107-127, 2005.
Sayah, John Y., et al.; "On-demand business collaboration enablement with web services;" Decision Support Systems 40; 107-127, 2005.
Superceded: Web Services Resource Framework; [online]; [retrieved on Jun. 2, 2009]; retrieved from the Internet http://www.ibm.com/developerworks/library/specification/ws--resource/.
Zhang Jia, et al.; "Web Services Quality Testing", International Journal of Web Services Research, Apr.-Jun. 2005, 2 (2), pp. 1-4.

(Continued)

*Primary Examiner* — Thomas Dailey
(74) *Attorney, Agent, or Firm* — Cantor Colburn LLP; Louis J. Percello

(57) ABSTRACT

A method is provided for implementing data-driven QoS control in design and development of an SOA solution. The method comprises implementing a QoS layer having a first set of architectural building blocks (ABBs) and configured to specify a QoS requirement definition to be propagated through a set of components of the SOA solution to generate QoS data for controlling and managing QoS in a unified form; and implementing a data architecture layer having a second set of ABBs and configured to facilitate propagation of generated QoS data through the set of components in the SOA solution.

12 Claims, 7 Drawing Sheets

OTHER PUBLICATIONS

Zhang, Liang-Jie, et al; " Web Services Relationships Binding for Dynamic e-Business Integration," International Conference on Internet Computing (IC'02), pp. 561-567, Jun. 2002.

Zhang, Liang-Jie, et al.; "Requirements Driven Dynamic Services Composition for Web Services and Grid Solutions;" Journal of Grid Computing 2; 2004; 121-140.

* cited by examiner

```xml
<xs:schema
    targetNamespace="http://servicescomputing.org/sccbook/qos/QoSRequirement"
    xmlns:tns="http://servicescomputing.org/sccbook/qos/QoSRequirement"
    xmlns:xs="http://www.w3.org/2001/XMLSchema">

<xs:element name="QosRequirementId" type="xs:string"/>
  <xs:element name="Description" type="xs:string"/>

<xs:element name="attribute" type="xs:string"/>

<xs:simpleType name="QosTypeEnumeration">
    <xs:restriction base="xs:string">
     <xs:enumeration value="Reliability"/>
     <xs:enumeration value="Security"/>
     <xs:enumeration value="Safety"/>
     <xs:enumeration value="Availability"/>
    </xs:restriction>
  </xs:simpleType>

<xs:simpleType name="OperatorEnumeration">
    <xs:restriction base="xs:string">
     <xs:enumeration value="GREATERTHAN"/>
     <xs:enumeration value="GREATERTHANOREQUALTO"/>
     <xs:enumeration value="EQUALTO"/>
     <xs:enumeration value="LESSTHAN"/>
     <xs:enumeration value="LESSTHANOREQUALTO"/>
    </xs:restriction>
  </xs:simpleType>

<xs:element name="constraint">
    <xs:complexType>
     <xs:sequence>
        <xs:element ref="attribute"/>
        <xs:element ref="operator" type="operatorEnumeration />
        <xs:element ref="attribute"/>
     </xs:sequence>
    </xs:complexType>
  </xs:element>
```

FIGURE 1a

```
<xs:element name="PreCondition">
  <xs:complexType>
    <xs:sequence>
       <xs:element ref="constraint" minOccurs="1" maxOccurs="unbounded"/>
    </xs:sequence>
  </xs:complexType>
</xs:element>

<xs:element name="PostCondition">
  <xs:complexType>
    <xs:sequence>
       <xs:element ref="constraint" minOccurs="1" maxOccurs="unbounded"/>
    </xs:sequence>
  </xs:complexType>
</xs:element>

<xs:element name="QoSRequirement">
  <xs:complexType>
    <xs:sequence>
       <xs:element ref="QosRequirementId"/>
       <xs:element ref="Description"/>
       <xs:element name="QosType" type="QosTypeEnumeration"/>
       <xs:element ref="PreCondition"/>
       <xs:element ref="PostCondition"/>
    </xs:sequence>
  </xs:complexType>
</xs:element>
...
</xs:schema>
```

FIGURE 1b

```
<wsdl:definitions
    targetNamespace="http://servicescomputing.org/sccbook/qos/QoSRequirement"
    xmlns:wsdl="http://schemas.xmlsoap.org/wsdl/"
    xmlns:xs="http://www.w3.org/2001/XMLSchema"
    xmlns:wsrp="
http://www.servicescomputing.org/sccbook/qos/web-services/ws-resourceProperties"
    xmlns:tns="http://www.servicescomputing.org/sccbook/qos/QoSRequirement">
...
    <wsdl:types>
       <xs:schema>
          <xs:import namespace="
http://servicescomputing.org/sccbook/qos/QoSRequirement"
             schemaLocation="..."/>
       </xs:schema>
    </wsdl:types>
...
    <wsdl:portType name=" QoSRequirement PortType" wsrp:resourceProperties="tns:
QoSRequirement ">
       <operation name="getQoSRequirementId"/>
       <operation name="getDescription"/>
       <operation name="getQoSType"/>
       <operation name="getPreCondition"/>
       <operation name="getPostCondition"/>
...
    </wsdl:portType>
...
    </wsdl:definitions>
```

Business Process
310

Business Protocol
320

Business Construct
330

Business Primitive
340

Message
350

Data Entity
360

METHOD AND APPARATUS FOR MODELING AND MANAGING QUALITY OF SERVICE (QOS) IN A SERVICE-ORIENTED ARCHITECTURE (SOA) ENVIRONMENT

BACKGROUND OF THE INVENTION

1. Field of the Invention

Exemplary embodiments of the present invention relate to Service-Oriented Architecture (SOA) solutions, and more particularly, to Quality of Service (QoS) in SOA solutions.

2. Description of Background

The notion of Service-Oriented Architecture (SOA) has received significant attention within the software design and development community. SOA is a paradigm for organizing and utilizing distributed capabilities that may be under the control of different ownership domains. SOA provides a uniform means to offer, discover, interact with, and use capabilities to produce desired effects consistent with measurable preconditions and expectations. SOA allows business and IT convergence through agreement on a set of loosely-coupled, business-aligned IT services that collectively support an organization's business processes and goals. Not only does it provide flexible, decoupled functionality that can be reused, but it also provides the mechanisms to externalize variations of Quality of Service (QoS); for example, in declarative specifications such as WS-Policy and related standards.

The SOA concept is based on an architectural style in which services are the mechanism by which needs and capabilities are brought together. A service is a software resource (discoverable) with an externalized service description. In general, entities (people and organizations) offer capabilities and act as service providers. Those with needs who make use of services are referred to as service consumers. The service description is available for searching, binding, and invocation by a service consumer, allowing prospective consumers to decide if the service is suitable for their current needs and establishing whether a consumer satisfies any requirements of the service provider.

The main drivers for SOA-based architectures are to facilitate the manageable growth of large-scale enterprise systems, to facilitate Internet-scale provisioning and use of services, and to reduce costs in cooperation between organizations. SOA provides a simple, scalable paradigm for organizing large networks of systems that require interoperability to realize the value inherent in the individual components. SOA is commonly implemented using Web services. A major focus of Web services is to make functional building blocks accessible over standard Internet protocols that are independent from platforms and programming languages. These services can be either new applications or existing legacy applications wrapped by Web service interfaces to make them network enabled. Nevertheless, although SOA and Web services technology have widely been considered as the next-generation paradigm for distributed computing and Internet computing, the speed of their actual adoption has been quite slow.

One essential reason is the lack of a systematic method that allows service providers to ensure QoS of the provided services at the solution level. QoS can include goals for information availability, performance, data throughput, and consistency or accuracy of the data Inherent in SOA are characteristics that exacerbate existing QoS concerns in computer systems. Among these characteristics are: increased virtualization, loose coupling, widespread use of XML, the composition of federated services, heterogeneous computing infrastructures, decentralized service level agreements (SLAs), and the needs to aggregate IT QoS metrics to produce business metrics. These characteristics create complications for QoS that clearly require attention within any SOA solution. Without having a guarantee regarding quality of an entire solution, businesses will be reluctant to adopt the products and services provided by the solution. Therefore, a technique that supports SOA and Web services-oriented solution-level QoS management is desired.

The Web services community has been putting significant effort into addressing the issue of QoS challenges related to Web services. In the current Web services standard stack, a dedicated QoS layer is identified to accumulate standards and protocols that enhance the trustworthiness of Web services in various aspects. In this current QoS layer, four standards have been specified in regard to four corresponding perspectives: security, transaction, reliable messaging, and resource lifetime management. Web Services Security (WS-Security) provides a set of mechanisms to help Web service developers in securing SOAP message exchanges. Web Services Transaction (WS-TM) intends to facilitate interoperability across existing transaction managers, long running compensations, and asynchronous business process flows. Web Services Reliability (WS-Reliability) is a SOAP-based protocol designed to ensure reliable message exchanges. WS-Resource Lifetime specification defines message exchanges to standardize the means how a WS-Resource can be destroyed, and how resource properties (WS-ResourceProperties) can be used to inspect and monitor the lifetime of a WS-Resource.

It can be seen that the QoS layer provided in the current Web services standard stack defines a set of standards to help developers enhance the quality of Web services at the low-level message and transaction levels. To convince enterprises to adopt external Web services into their business processes, however, the quality of Web services needs to be assured at the solution level that provides integrated QoS control at various granularity levels. Furthermore, these existing standards focus on individual QoS attributes at the service level. An enterprise service typically involves multiple collaborative business services (for example, a travel planning service can involve an airline ticket booking service, a hotel reservation service, and a car rental service). QoS control needs to be offered at the composite service level instead of individual service level. Moreover, the current Web services QoS standards merely focus on a small subset of QoS attributes (for example, security and reliability). Major requirements supporting QoS in Web services should include a holistic set of attributes that includes availability, accessibility, integrity, performance, reliability, regulatory, and security.

Accordingly, it is desirable to provide for a method for guiding software engineers in creating and enabling a management framework that helps to align business with IT while providing for fine-grained SOA solution-level QoS control.

SUMMARY OF THE INVENTION

The shortcomings of the prior art can be overcome and additional advantages can be provided through exemplary embodiments of the present invention that are related to a method for implementing data-driven QoS control in design and development of an SOA solution. The method comprises implementing a QoS layer having a first set of architectural building blocks (ABBs) and configured to specify a QoS requirement definition to be propagated through a set of components of the SOA solution to generate QoS data for controlling and managing QoS in a unified form; and implementing a data architecture layer having a second set of ABBs and configured to facilitate propagation of generated QoS data through the set of components in the SOA solution.

The shortcomings of the prior art can also be overcome and additional advantages can also be provided through exemplary embodiments of the present invention that are related to computer program products and data processing systems corresponding to the above-summarized method are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

TECHNICAL EFFECTS

As a result of the summarized invention, technically we have achieved a solution that can be implemented to provide a mechanism for creating a data-driven Quality of Service (QoS) management framework at the SOA solution level. Exemplary embodiments can address QoS data enablement from the following five perspectives: (1) representing context-aware QoS data in a unified form; (2) communicating QoS data through high-level message exchange under constraints; (3) propagating QoS data in system architecture at various granularities; (4) detecting QoS events at run time; and (5) handling QoS events.

BRIEF DESCRIPTION OF THE DRAWINGS

The subject matter that is regarded as the invention is particularly pointed out and distinctly claimed in the claims at the conclusion of the specification. The foregoing and other objects, features, and advantages of the invention are apparent from the following detailed description of exemplary embodiments of the present invention taken in conjunction with the accompanying drawings in which:

FIGS. 1a-1b illustrate an exemplary embodiment of a QoS Requirement definition segment that is described using XML Schema and modeled according to WS-Resource properties specifications.

FIG. 2 is an exemplary embodiment of an XML Schema segment that can be employed to associate a WS-Resource properties document with a Web service.

Figures 3, 4:
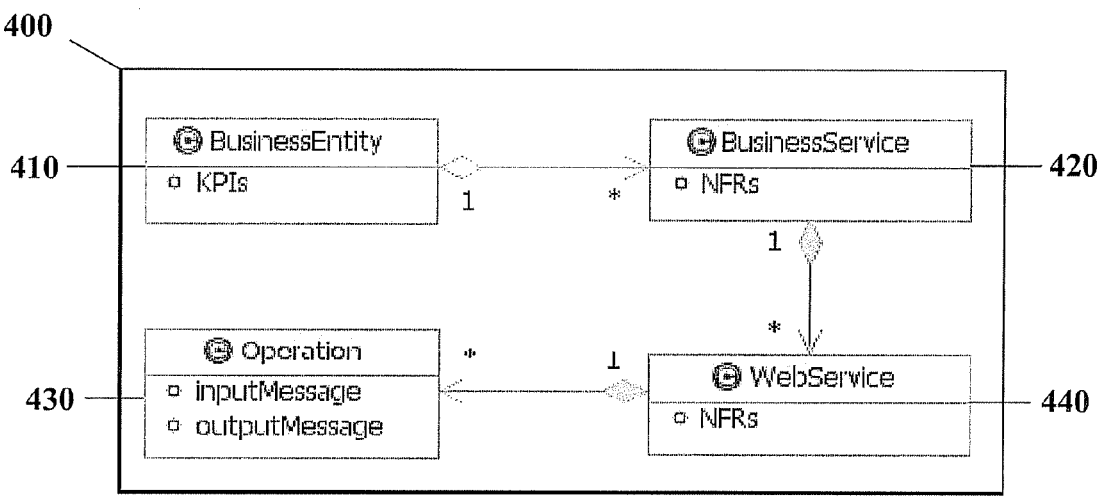
FIG. 3 is a block diagram illustrating an exemplary embodiment of a path for QoS event communication.
FIG. 4 is a block diagram illustrating an exemplary embodiment of a layered SOA relationship model representing a comprehensive business relationship.

The detailed description explains exemplary embodiments of the present invention, together with advantages and features, by way of example with reference to the drawings. The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

DETAILED DESCRIPTION OF EXEMPLARY EMBODIMENTS

While the specification concludes with claims defining the features of the invention that are regarded as novel, it is believed that the invention will be better understood from a consideration of the description of exemplary embodiments in conjunction with the drawings. It is of course to be understood that the embodiments described herein are merely exemplary of the invention, which can be embodied in various forms. Therefore, specific structural and functional details disclosed in relation to the exemplary embodiments described herein are not to be interpreted as limiting, but merely as a representative basis for teaching one skilled in the art to variously employ the present invention in virtually any appropriate form. Further, the terms and phrases used herein are not intended to be limiting but rather to provide an understandable description of the invention.

Exemplary embodiments of the present invention can be implemented to provide a mechanism for creating a data-driven Quality of Service (QoS) management framework at the SOA solution level. In exemplary embodiments, QoS management is realized through a logical QoS layer in association with a logical Data Architecture layer. Each of these layers comprises a group of fine-grained, configurable and re-configurable architectural building blocks (ABBs) that can be implemented based upon best practices in SOA solution design and development. These ABBs have implicit relationships and interaction patterns associated between them, and are further defined by extensible rules that allow for adaptability to evolutionary changes.

Exemplary embodiments of the present invention can be implemented to address the lack of solution-level QoS support for SOA application systems in several ways. First, exemplary embodiments can be implemented to provide a mechanism for guiding SOA solution architects in the creation of QoS monitoring, tracking, and management capabilities at the solution-level. Exemplary embodiments can provide for a set of ABBs configured with recommended relationships and interaction patterns for two dedicated logical layers, a QoS layer associated with a Data Architecture layer. These two layers can be implemented to provide a fine-grained architectural model that is capable of guiding and facilitating the rapid creation of QoS management capabilities for an entire enterprise-level SOA solution.

Second, exemplary embodiments can be implemented to enable solution-level management of QoS data through five contexts: (1) representing context-aware QoS data in a unified form; (2) communicating QoS data through high-level message exchange with constraints; (3) propagating QoS data in system architecture at various granularities (for example, layers and ABBs); (4) detecting QoS events at run time; and (5) handling QoS events.

Third, exemplary embodiments can be implemented to provide a multi-dimensional contextual model for supporting solution-level QoS management that includes key performance indicators (KPIs), environment, and SOA-oriented relationships.

Fourth, exemplary embodiments can be implemented to address various aspects of quality control and management of an SOA solution, such as security, safety, reliability, and availability, by providing a cluster of QoS attributes. More specifically, dedicated solution-level QoS content and enablement modules can facilitate translation of business requirements and service-level agreements into proper representations of corresponding QoS attributes, thereby allowing QoS attributes to become flexible and extensible.

Fifth, exemplary embodiments can be implemented to provide a dedicated Data Architecture layer configured to provide data that can be used to provide continued architectural support for solution-level data-driven QoS management. This Data Architecture layer can be configured to decouple all data-related manifestation, aggregation, transformation, and manipulation from the QoS logic to provide for a QoS management service having higher reusability, flexibility, and extensibility. The Data Architecture layer can be configured to separate data manifestation and manipulation from QoS specifications and thereby allow the QoS services to be reused at various business scenarios and domains. Moreover, the Data Architecture layer can be delivered as an independent service at various granularities.

Exemplary embodiments of the present invention can be implemented to provide a data-driven QoS model that can be customized and applied in designing and developing reusable, flexible, and extensible solution-level QoS services for SOA solutions. Exemplary embodiments are suitable for use by software architects responsible for designing the software architecture for enterprise-level QoS control for SOA solutions. The data-driven QoS model can be quickly configured and customized based upon specific business requirements into an architectural proposal to customers. Moreover, the customized data-driven QoS model and data architecture model can be directly delivered to the corresponding development team as an architectural template for the final solution development.

Exemplary embodiments of the present invention can be implemented to provide a solution-level, context-aware QoS model that qualitatively and quantitatively defines the quality of an SOA solution. This concept of SOA-solution quality is defined using a combination of a set of four attributes: reliability ("Re"), security ("Se"), safety ("Sa"), and availability ("Av"). In exemplary embodiments, the assessment of the quality of an SOA solution using these attributes can be based upon a surrounding context that is specified by a comprehensive set of SOA-oriented contextual parameters, including business-level requirements such as KPIs (for example, delivery time and execution cost), the delivery environment, and SOA relationships. In other words, the quality of an SOA solution can be represented as a function of the attributes specified above that is determined based upon a specific context. As a result, each attribute may contribute differently to the quality of an SOA solution in different contexts.

Exemplary embodiments of the present invention can be implemented to provide a logical QoS layer that is associated with a supportive logical Data Architecture layer that comprises a set of fine-grained ABBs. These ABBs can be derived from industry best practices in the field of SOA to provide guidance for an SOA solution architect to rapidly configure and develop a flexible and extensible prototype for a data-driven QoS control and management solutions. Exemplary embodiments can describe the relationships and interaction patterns between ABBs within and across layers to allow the ABBs to be customized during design and re-configurable at run-time to adapt to evolutionary changes.

Rather than creating a new description method, exemplary embodiments can be implemented to provide a QoS Requirement definition that applies the Web Services Resource Framework (WSRF) in defining QoS data as universal resources. This QoS requirement definition can be applied to enable a uniform, flexible, and extensible QoS data model that is enabled over the entire SOA solution. WSRF implements an XML-based presentation method for capturing resources to define a system of specifications for managing and accessing stateful resources (that is, resources capable of maintaining the status of a process or transaction) using Web services. Thus, WSRF can be utilized to allow for QoS information to be carried by a system or system components, and to persist across and evolve as a result of Web service interactions, according to the particular QoS Requirement definition provided.

In accordance with the present invention, FIGS. 1a-1b illustrate an exemplary embodiment of a QoS Requirement definition segment, QoSRequirement, that is described using XML Schema and modeled according to WS-Resource properties specifications. This XML Schema segment includes relative segments of the resource properties document definitions for QoSRequirement. In the present exemplary embodiment, the state of a QoSRequirement contains five elements: QosRequirementId, Description, QosType, PreCondition, and PostCondition. Each element is provided as either a simple or a user-defined XML Schema Definition (XSD). QosRequirementId is used to provide a unique identifier for a QoS Requirement definition in the form of an XSD type String (xsd:string). Description is used to provide for textual descriptions of the QoS requirement in the form of an XSD type String. QosTypeEnumeration is used to specify to which four software attributes (Reliability, Security, Safety, and Availability) the QoS Requirement definition is related. PreCondition specifies the precondition of the QoS Requirement definition, and PostCondition specifies the precondition of the QoS Requirement definition. Both PreCondition and PostCondition are described using one or multiple constraints in the form of <attribute, operator, attribute>, where an attribute is in the form of an XSD type String (xsd:string) and operator being one of the five predefined operator values ($>$, $>=$, $==$, $<$, $<=$) of type operatorEnumeration.

It should be discoverable to service consumers that QoSRequirement defines the WS-Resource properties document associated with a Web service. FIG. 2 illustrates an exemplary embodiment of an XML Schema segment that can be employed to associate the WS-Resource properties document declaration with the WSDLportType definition in the WSDL definition of the Web service interface through the use of a standard attribute resourceProperties. As shown in FIG. 2, portType, along with the associated resource properties document, defines the type of the WS-Resource by providing a set of five operations to allow users to access the state information of QoSRequirement definition: getQoSRequirementId, getDescription, getQoSType, getPreCondition, and getPostCondition.

In exemplary embodiments, to provide for management of QoS data at the solution level, after a QoS requirement definition is represented as a universal Web service resource, the QoS requirement definition can be communicated between various architectural components using high-level message exchange capabilities provided by a common service resource. More specifically, each of the architectural components can be equipped with corresponding QoS requirements as validators that analyze the component's relationships to other components and propagate the component's QoS requirements to the other components. For example, where there is a child-parent relationship between two components, the parent's QoS requirements will be inherited by the child component. In exemplary embodiments, QoS requirements data can be communicated from one component to another through message delivery of QoS metrics and carried by business protocols. To determine whether a QoS requirement needs to be propagated to another component, the relationships between the two components need to be analyzed first. As described below, exemplary embodiments of the present invention can be implemented to provide a layered business relationship model for analyzing relationships between components.

In exemplary embodiments, if a QoS requirement cannot be satisfied at one architectural component at runtime, a QoS validation failure event can be generated and propagated to all related components. Each receiving component can then validate its corresponding QoS requirements. If these requirements cannot be satisfied, the component can in turn propagate the QoS events to its related components. Such a chained QoS event propagation can, for example, aid in performing runtime variation impact analysis.

Referring now to FIG. 3, an exemplary embodiment of a path 300 for QoS event communication that can be implemented to handle propagation of QoS events at various hierarchical levels is illustrated. In FIG. 3, QoS data is propagated through six layers: a business process layer 310, a business protocol layer 320, a business construct layer 330, a business primitive layer 340, a message layer 350, and a data entity layer 360. The layered structure of FIG. 3 is based on the eBC information structure that is proposed in "On-demand Business Collaboration Enablement with Web Services" (John Y. Sayah, Liang-Jie Zhang, Decision Support Systems 40(1), pp. 107-127, 2005), incorporated herein by reference thereto, and extends these specifications for performing generic SOA QoS data management.

Referring now to FIG. 4, an exemplary embodiment of a layered SOA relationship model 400 representing a comprehensive business relationship is illustrated using a UML class diagram. This business relationship model is based on the model proposed in "Web Services Relationships Binding for Dynamic e-Business Integration" (Liang-Jie Zhang, Henry Chang, Tian Chao, International Conference on Internet Computing (IC2002), pp. 561-567, June, 2002), incorporated herein by reference thereto, which comprises three elements: business entity, service, and operation. The present exemplary embodiment extends the original three-element model to a four-element model by dividing the service element into two elements, a business service element and a Web service element, to decouple services involving business logic from IT services (that is, Web services) for higher reusability, extensibility, and reusability. Thus, model 400 identifies four types of elements: a business entity element 410, a business service element 420, a Web service element 430, and an operation element 440. A business entity element represents a business organization that provides services and/or consumes services from other business entities. A business entity can be either an entire enterprise or a business unit inside of an enterprise. A business service element operates to realize some business functions in an enterprise. From an IT perspective, a business service is a conceptual service that is independent of IT technologies. A Web service element implements a business service using the Web services technology. In other exemplary embodiments, a business service can be realized using other IT technologies. A Web service element operates to publish a business service on the Internet (for example, using WSDL) for consumption. From an IT perspective, a Web service may be independent of implementation platforms. An operation element represents a specific function provided by a service. An operation is involved with the internal implementation of a service and its corresponding infrastructure support.

In the present exemplary embodiment, as shown in FIG. 4, the four element types exhibit a layered relationship: a business entity can provide multiple business services in an aggregation relationship; a business service can be implemented by multiple Web services in different ways in a composition relationship; and a Web service may contain multiple operations in a composition relationship. Furthermore, as shown in FIG. 4, each of the four element types comprises some certain attributes: a business entity contains KPIs; a business service contains business-level non-functional requirements (NFRs); a Web service contains IT-level NFRs; and an operation contains input messages and output messages.

Figure 5:
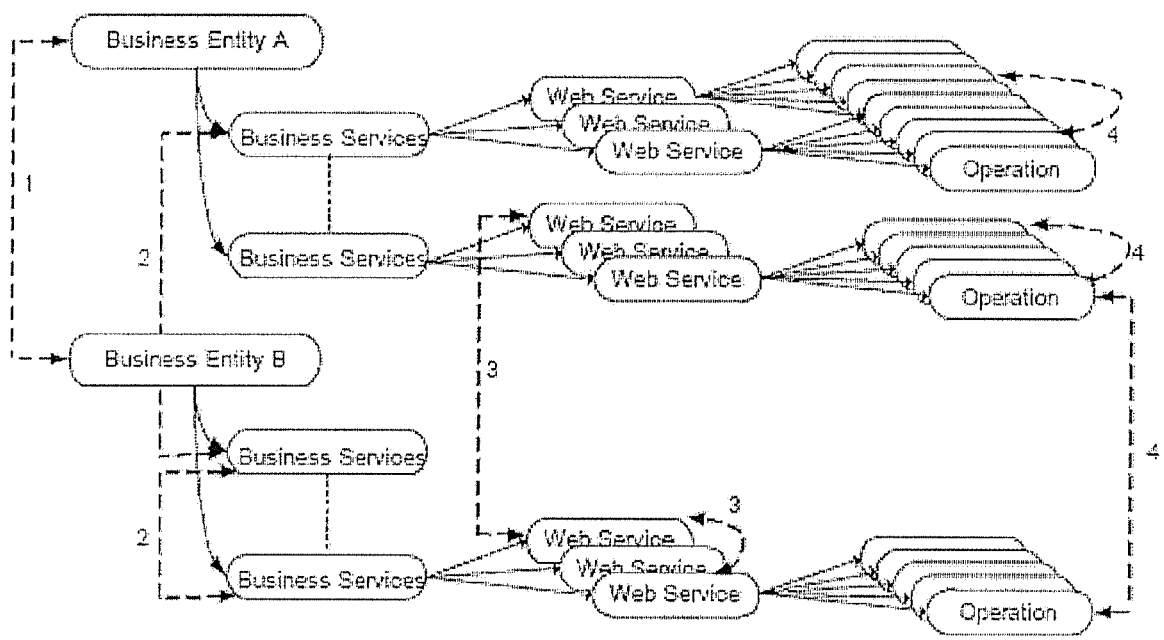
FIG. 5 is a block diagram illustrating an exemplary embodiment of a layered SOA relationship model 500 representing a comprehensive service-oriented relationship.

Referring now to FIG. 5, an exemplary embodiment of a layered SOA relationship model 500 representing a comprehensive service-oriented relationship is illustrated. Relationship model 500 captures service-oriented relationships at nine different granularities: (1) a business-to-business relationship (B-B-R), (2) a business service-to-business service relationship (BS-BS-R), (3) a Web service-to-Web service relationship (WS-WS-R), (4) an operation-to-operation relationship (O-O-R), (5) a business-to-business service relationship (B-BS-R), (6) a business-to-Web service relationship (B-WS-R), (7) a business-to-operation relationship (B-O-R), (8) a business service-to-Web service relationship (BS-WS-R), and (9) a Web service-to-operation relationship (WS-O-R). These relationships define the hierarchical relationships between service-related elements.

Figure 6:
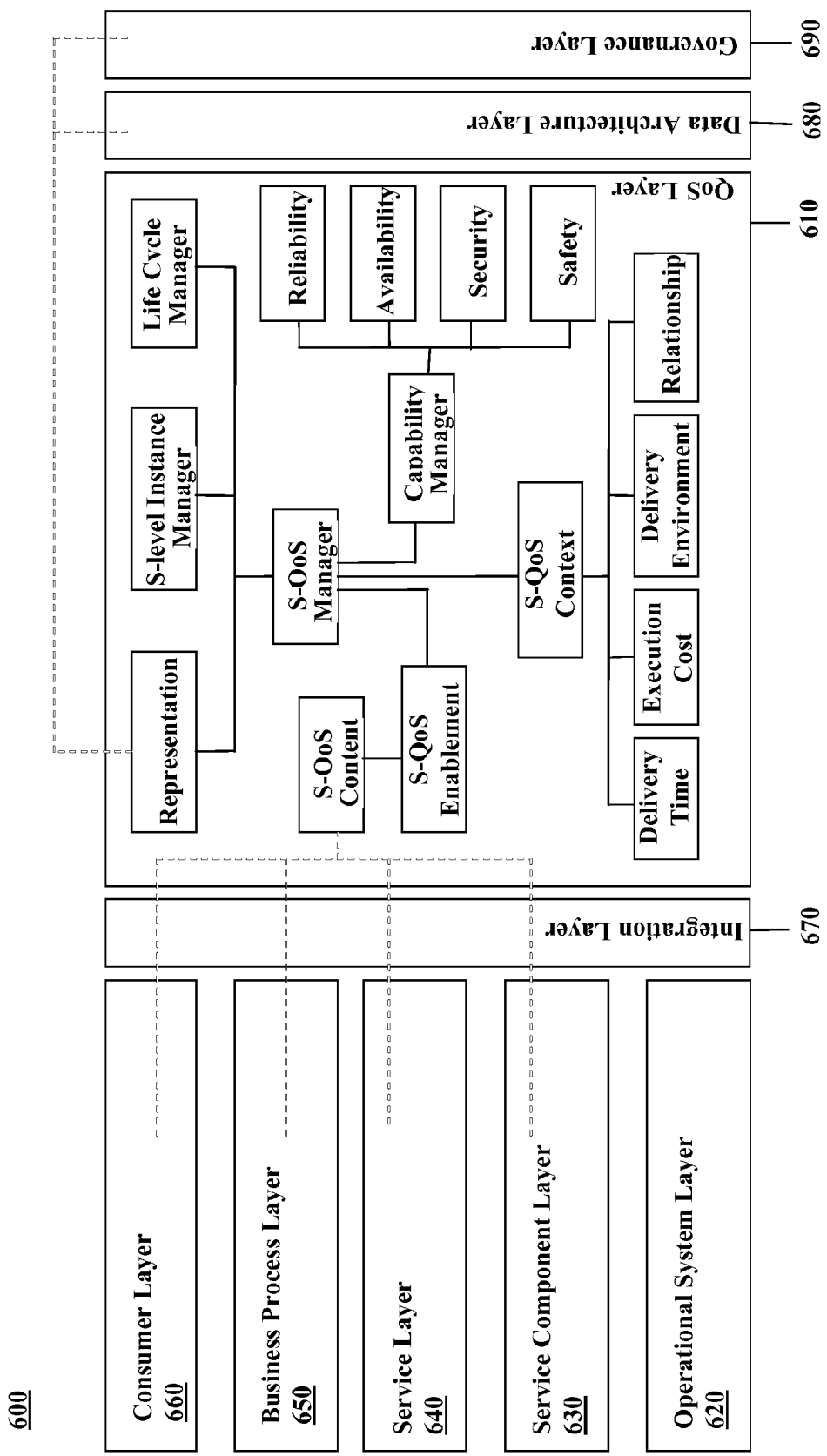
FIG. 6 is a block diagram illustrating an exemplary embodiment of an SOA architectural model in accordance with the present invention, shown incorporating a set of ABBs within a QoS layer.

Exemplary embodiments of the present invention can be implemented to provide a fine-grained set of ABBs with interaction patterns in a QoS layer that operates to control and manage the quality of an SOA solution. The set of ABBs can, for example, be mapped to the IBM SOA Solution Stack (S3)'s QoS layer. Referring now to FIG. 6, an exemplary embodiment of a QoS layer 610 implementing such a set of ABBs within a typical SOA architectural model 600 is illustrated. As shown in FIG. 6, QoS layer 610 connects to each of an Operational System layer 620, a Service Component layer 630, a Service layer 640, a Business Process layer 650, a Consumer layer 660, an Integration layer 670, a supportive Data Architecture layer 680, and a Governance layer 690 in SOA model 600.

In the present exemplary embodiment, Operational System layer 620 contains existing packaged applications and legacy systems that can be reused by other upper-level services; Service Component layer 630 provides reusable services-based components to be used to compose services with business logic or business processes, Service layer 640 provides business services that may be composed from services components using utility services; Business Process layer 650 leverages the Service layer to quickly compose and choreograph services to fulfill customer requirements; Consumer layer 660 is the presentation layer that leverages the Business Process layer and the Service layer to quickly construct the user interfaces of business services to fulfill customer requirements; Integration layer 670 is an enabler for an SOA as it provides the capability to mediate, route, and transform service requests between service requestors and service providers; and Governance layer 690 provides design guidance to ensure the proper design of the SOA solution architecture.

In FIG. 6, SOA model 600 is also shown as incorporating a set of ABBs within QoS layer 610. More specifically, sixteen fundamental ABBs are provided for in QoS layer 610 in FIG. 6: (1) an s-QoS manager ABB, (2) a representation ABB, (3) a capability manager ABB, (4) an s-QoS context ABB, (5) an s-QoS enablement ABB, (6) an s-level instance manager ABB, (7) a life cycle manager ABB, (8) a delivery time ABB, (9) an execution cost ABB, (10) a delivery environment ABB,

(11) a relationship ABB, (12) an s-QoS content ABB, (13) a reliability ABB, (14) an availability ABB, (15) a security ABB, and (16) a safety ABB.

In the present exemplary embodiment, s-QoS manager 601 is provided as the centralized controller that coordinates the other identified ABBs in QoS layer 610. S-QoS manager has six first-level child ABBs: representation ABB, s-level instance manager ABB, life cycle manager ABB, s-QoS enablement ABB, capability manager ABB, and s-QoS context ABB. S-QoS enablement ABB is associated with s-QoS content ABB. In turn, capability manager ABB 603 has four first-level child ABBs: reliability ABB, availability ABB, security ABB, and safety ABB. S-QoS context ABB, in turn, also has four first-level child ABBs: delivery time ABB, execution cost ABB, delivery environment ABB, and relationship ABB.

An s-QoS manager ABB provides a centralized controller that coordinates all other identified ABBs in QoS layer 610. It is referred to as an s-QoS manager rather than a QoS manager because it represents solution-level QoS management instead of a service-level QoS management. There is a one-to-one relationship between an s-QoS manager ABB and each of a representation ABB, an s-level instance manager ABB, a life cycle manager ABB, an s-QoS enablement ABB, capability manager ABB, and an s-QoS context ABB.

A representation ABB is responsible for providing a unified description interface for QoS requirements. Web Services Resource Framework (WSRF) and WS-Policy are two possible candidates.

A capability manager ABB is responsible for describing the detailed solution-level QoS requirements in terms of traditional software-related attributes. As described above, four QoS requirements are captured as default sub-ABBs to a capability manager ABB: reliability, availability, security, and safety. Thus, there is a one-to-one relationship between a capability manager ABB and each of a reliability ABB, an availability ABB, a security ABB, and a safety ABB. It should be noted that, in exemplary embodiments, other, additional software-related attributes can be plugged into QoS layer 610 as sub-ABBs for the capability manager ABB.

An s-QoS context ABB is responsible for maintaining contextual information for solution-level QoS management. An s-QoS context ABB contains four categories of information: delivery time, execution cost, delivery environment, and relationship. This implies that solution-level QoS measurement and assessment are already based upon surrounding contexts. There is a one-to-one relationship between an s-QoS context ABB each of a delivery time ABB, an execution cost ABB, a delivery environment ABB, and a relationship ABB.

An s-QoS enablement ABB is responsible for adapting solution-level QoS requirements into layer-specific QoS requirements. For example, a solution-level QoS requirement may imply different QoS requirements in Consumer layer 660 and Business Process layer 650.

An s-level instance manager ABB is responsible for managing running instances of various layers under the constraints of solution-level QoS requirements.

A life cycle manager ABB is responsible for managing solution-level QoS requirements during the period of a solution's life cycle, from the time when the solution is delivered to the time when the solution is terminated or discarded.

A delivery time ABB is responsible for recording, tracking, and monitoring the time needed to deliver a specific solution.

An execution cost ABB is responsible for recording, tracking, and monitoring the cost needed to execute a specific solution.

A delivery environment ABB is responsible for defining the running environment necessary to deliver a specific solution.

A relationship ABB is a layered structure that is responsible for defining SOA-oriented business relationships regarding a solution. Three layers are defined: business entity level, service level, and operation level. A business entity-level relationship refers to a coupling relationship between business entities, their goals, objectives, etc. A service-level relationship refers to an interaction relationship between services. An operation-level relationship refers to a supportive or temporal relationship between operations provided by services. These business relationships operate to supplement functionalities for solution-level quality control.

An s-QoS content ABB is responsible for storing layer-specific <name, value> pairs of QoS attributes and required values. There is a one-to-one relationship between an s-QoS enablement ABB and an s-QoS content ABB.

A reliability ABB is responsible for handling the reliability feature of a solution. A reliability ABB represents the rate that a solution can be successfully executed without failure during a certain period of time.

An availability ABB is responsible for handling the availability feature of a solution. Because a solution here refers to an SOA-oriented business solution, it implies a network-based service that is accessible remotely. A solution is considered to provide high availability if its delay is always below some predefined threshold that is based on an expected rate of network failures.

A security ABB is responsible for handling the security feature of a solution. Because a solution here refers to an SOA-oriented business solution, it implies a network-based service that is accessible remotely. Due to unpredictable network features, a solution is considered to provide high security if it ensures authentication and authorization based upon proper roles.

A safety ABB is responsible for handling the safety feature of a solution. A solution is considered to be safe if it is protected against predefined types of failure, damage, error, accidents, and harm.

The relationships between the identified ABBs in QoS layer 610 are indicated by solid lines in FIG. 6. In the present exemplary embodiment, certain relationships also exist between the identified ABBs within QoS layer 610 and the other layers of SOA architectural model 600, as indicated by the dashed lines in FIG. 6. For example, an s-QoS content ABB is configured to interact with the Consumer layer, the Business Process layer, the Service layer, and the Service Component layer; and a representation ABB is configured to interact with the Data Architecture layer and the Governance layer. Furthermore, the s-QoS manager ABB interacts with various layers of SOA architectural model 600: the Consumer layer, the Business Process layer, the Service layer, the Service Component layer, the Operational System layer, the Integration layer, the Data Architecture layer, and the Governance layer. To simplify FIG. 6, these connections are not shown.

To further illustrate the relationships of the ABBs in QoS layer 610, one exemplary embodiment of a dynamic interaction pattern between the ABBs can involve an information retrieval process performed by taking the following actions: (1) the Consumer layer sends a request for QoS content to s-QoS manager ABB; (2) the s-QoS manager ABB sends a request to the representation ABB; (3) the representation ABB replies with representation document to the s-QoS manager ABB; (4) the s-QoS manager ABB sends a request to the life cycle manager ABB; (5) the life cycle manager ABB replies with life cycle information to the s-QoS manager ABB; (6) the s-QoS manager ABB sends a request to the capability manager ABB; (7) the capability manager ABB sends a request to the reliability ABB; (8) the reliability ABB replies to the capability manager ABB; (9) the capability manager ABB sends a request to the availability ABB; (10) the availability ABB replies to the capability manager ABB; (11) the capability manager ABB sends a request to the security ABB; (12) the security ABB replies to the capability manager ABB; (13) the capability manager ABB sends a request to the safety ABB; (14) the safety ABB replies to the capability manager ABB; (15) the capability manager ABB replies to the s-QoS manager ABB with capability information; (16) the s-QoS manager ABB sends a request to the s-QoS context ABB; (17) the s-QoS context ABB sends a request to the delivery time ABB; (18) the delivery time ABB replies to the capability manager ABB; (19) the capability manager ABB sends a request to the execution cost ABB; (20) the execution cost ABB replies to the capability manager ABB; (21) the capability manager ABB sends a request to the delivery environment ABB; (22) the delivery environment ABB replies to the capability manager ABB; (23) the capability manager ABB sends a request to the relationship ABB; (24) the relationship ABB replies to the capability manager ABB; (25) the s-QoS context ABB replies to the s-QoS manager ABB with contextual information; (26) the s-QoS manager ABB sends a request to the s-QoS enablement ABB; (27) the s-QoS enablement ABB sends a request to the s-QoS content ABB; (28) the s-QoS content ABB replies to the s-QoS enablement ABB with content information regarding the Consumer layer; (29) the s-QoS enablement ABB replies with content information regarding the Consumer layer to the s-QoS manager ABB; and (30) the s-QoS manager ABB replies with content information regarding the Consumer layer to the Consumer layer.

It should be noted the preceding exemplary interaction pattern is non-limiting, and that the information retrieval performed across the ABBs in QoS layer 610 in exemplary embodiments can be customized, as well as reconfigured, to follow other interaction patterns in accordance with various business requirements.

In exemplary embodiments in accordance with the present invention, a dedicated logical Data Architecture layer that is associated with QoS layer 610 is can be implemented within SOA architectural model 600 to separate data manifestation and manipulation from QoS control. The Data Architecture layer can be implemented to provide a unified representation and enablement framework that integrates with structured and non-structured data architecture to facilitate value chain integration. Examples of domain-specific data architecture include the Shared Information and Data model (SID) in Enhanced Telecom Operations Map (eTOM) of telecom industry and the RosettaNet Technical Dictionary and RosettaNet Business Dictionary defined by RosettaNet for electronics industry.

Figure 7:
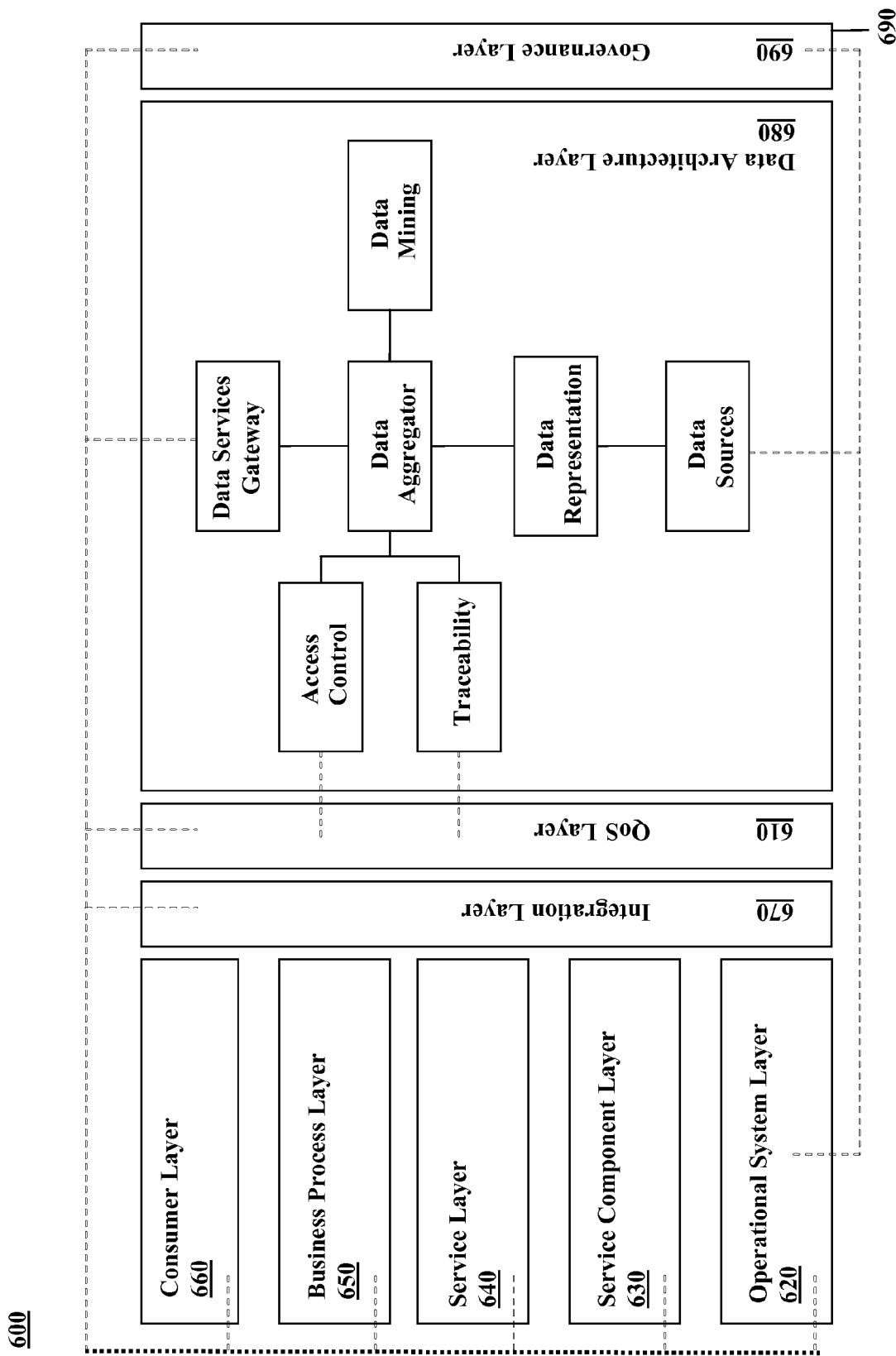
FIG. 7 is a block diagram illustrating an exemplary embodiment of an SOA architectural model in accordance with the present invention, shown incorporating a set of ABBs within a Data Architecture layer.

Referring now to the exemplary embodiment illustrated in FIG. 7, SOA architectural model 600 is shown as incorporating a set of ABBs within a Data Architecture layer 680. More specifically, seven fundamental ABBs are provided for in Data Architecture layer 680 in FIG. 7: (1) a data services gateway ABB, (2) a data aggregator ABB, (3) a data mining ABB, (4) a access control ABB, (5) a traceability ABB, (6) a data representation ABB, and (7) a data sources ABB. As shown in FIG. 7, data aggregator is the centralized controller that coordinates all other identified ABBs within Data Architecture layer 680. Data services gateway ABB acts as the gateway for Data Architecture layer 680, and the other layers typically interact with the data services gateway to obtain data-related services from the Data Architecture layer.

A data services gateway ABB is responsible for providing the gateway of Data Architecture layer 680. A data services gateway ABB has three primary responsibilities: to expose data as services, to add/remove/manipulate data entries in different services or service components, and to disable some data from outside access.

A data aggregator ABB provides the federated data manager of Data Architecture layer 680. A data aggregator ABB has three primary responsibilities: to dispatch requests to other ABBs, to handle data transformation (including transformation of data types and contents); and to aggregate data from multiple data sources. There is a one-to-one relationship between a data aggregator ABB each a data services gateway ABB, an access control ABB, a traceability ABB, a data mining ABB, and a data representation ABB.

A data mining ABB is responsible for analyzing data access history and providing optimization algorithms and business intelligence for data optimization.

An access control ABB is responsible for handling the access privileges of various participants to data. An access control ABB typically involves authorization and authentication functionalities for registered participants, and normally defines access control attributes. For example, an access control ABB can be implemented to handle who can see, access, or edit which portions of a data source (for example, documents).

A traceability ABB is responsible for monitoring and managing data usages using a log-like facility. A traceability log can include, for example, information on who has accessed data, when, and what part of the data has been accessed.

A data representation ABB is responsible for representing data from various data sources in a unified data format. In other words, a data representation ABB intends to hide various data sources and present data in uniform formats to other ABBs for data handling. It should be noted that the data representation ABB may link to various data sources and handle relationships between the data sources.

A data sources ABB represents the actual data repositories in various types, such as a DB2 database in the Operational System layer, a paypal representation, or an excel file. A data sources ABB represents high-level links associated with metadata to real data sources in the Operational System layer. For example, instead of containing (for example, attaching) a large document, the data sources ABB can be implemented to provide an on-demand link to the original document, together with some metadata describing the document (for example, goals, purposes, and short descriptions) that help users decide whether he/she needs to access the original document (for example, a CEO may decide not to download a detailed design document that a project architect may decide to download and review). In exemplary embodiments, a data sources ABB can represent industry-specific data structure. As a result, transformation may be needed for further processing. There is a many-to-one relationship between a data representation ABB and a data sources ABB.

The relationships between the identified ABBs in Data Architecture layer 680 are indicated by solid lines in FIG. 7. In the present exemplary embodiment, certain relationships also exist between the identified ABBs within Data Architecture layer 680 the other layers of SOA architectural model 600, as indicated by the dashed lines in FIG. 7. For instance, a data services gateway ABB is configured to interact with with the Consumer layer, the Business Process layer, the Service layer, the Service Component layer, the Operational System layer, the Integration layer, the QoS layer, and the Governance layer; an access control ABB and a traceability ABB are configured to interact with the QoS layer; and a data sources ABB is configured to interact with the Operational System layer and the Governance layer.

In exemplary embodiments, the service interaction manager ABB can be configured to directly interact with Operational System layer 540. In other exemplary embodiments, the service interaction manager ABB and the Operational System layer can indirectly interact with each other through other layers, such as the Integration layer or the Data Architecture layer.

To further illustrate the relationships of the identified ABBs in Service layer 520, one exemplary embodiment of a dynamic interaction pattern between the ABBs can involve an information retrieval process performed by taking the following actions: (1) the Consumer layer sends a request for data to the data services gateway ABB; (2) the data services gateway ABB forwards the request to the data aggregator ABB; (3) the data aggregator ABB sends a request to the access control ABB to check access privileges; (4) the access control ABB replies to the data aggregator ABB with access privileges; (5) the data aggregator ABB sends a request to the traceability ABB to check data access logs; (6) the traceability ABB replies to the data aggregator ABB with data access logs; (7) the data aggregator ABB sends a request to the data representation ABB; (8) the data representation ABB sends the request to the data sources ABB to fetch data; (9) the data sources ABB returns to the data representation ABB with data from multiple sources; (10) the data representation ABB replies to the data aggregator ABB with data; (11) he data aggregator ABB sends a request to the data mining ABB to analyze and optimize data; (12) the data mining ABB replies to the data aggregator ABB with optimized data; (13) the data aggregator ABB performs self-processing of data transformation; (14) the data aggregator ABB finishes self-processing of data transformation; (15) the data aggregator ABB returns the transformed data to the data services gateway ABB; and (16) the data services gateway ABB returns the data to the Consumer layer.

It should be noted the preceding exemplary interaction pattern is non-limiting, and that the information retrieval performed across the ABBs in Data Architecture layer 680 in exemplary embodiments can be customized, as well as reconfigured, to follow other interaction patterns in accordance with various business requirements.

Exemplary embodiments of the present invention can be utilized in the design and implementation of SOA solutions by providing roadmaps and guidelines for architectural, design, and implementation decisions, and by providing patterns and insights for integrating these aspects. Exemplary embodiments can be implemented to create reusable assets that enable end-to-end, SOA-based business solutions that can cover enterprise modeling, business process modeling, service modeling, as well as integration and management of business applications. In exemplary embodiments, this design and implementation can be business-process-driven, tool-based architecture-driven, or data-access-based (starting with information or data services), and can begin with message-based application integration through service-oriented integration, with legacy encapsulation and wrapping, or with legacy componentization and transformation. In exemplary embodiments, this design and implementation can leverage existing technologies and components that have an associated set of best practices that are not specifically related to SOA. For example, J2EE applications and components can be important parts of SOA solutions.

Exemplary embodiments of the present invention can be implemented to provide an abstract, layered and logical design of an SOA that has applicability to various types of architects and practitioners, such as enterprise architects, solution architects, and so forth. Architects can employ exemplary embodiments as a check list of layers, ABBS and their relations in each layer, the options available to them, and decisions that need to be made at each layer. The layers provide a starting point for the separation of concerns needed to build an SOA solution. Enterprise software architects can employ exemplary embodiments as a blueprint and customize it or instantiate it for each line of business or each product line (depending on how the organization is structured).

Exemplary embodiments of the present invention can be utilized in the design and implementation of SOA solutions within an expanding range as a result of the self-similarity of the application of SOA concepts recursively within larger or smaller scopes. For example, SOA-based design can start within a single project, expand to meet the needs of a line of business or a few lines of business sharing services, and then be expanded to an enterprise scale, a supply chain, or even a larger SOA ecosystem. In each case the principles of SOA tend to be applied in a similar manner.

Exemplary embodiments of the present invention can take the form of an entirely hardware embodiment, an entirely software embodiment, or an embodiment including both hardware and software elements. In exemplary embodiments implemented in software, the software can include, but is not limited to, firmware, resident software, microcode, etc.

Furthermore, exemplary embodiments can take the form of a computer program product accessible from a computer-usable or computer readable medium providing program code for use by or in connection with a computer or any instruction execution system. In exemplary embodiments, a computer-usable or computer-readable medium can be any apparatus that may include, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Examples of optical disks include read only memory compact disk (CD-ROM), read/write compact disk (CD-R/W) and DVD.

In exemplary embodiments, a data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

In exemplary embodiments, network adapters may also be coupled to the system to enable the data processing system to become coupled to other data processing systems or remote printers or storage devices through intervening private or public networks. Modems, cable modems, and Ethernet cards are just a few of the currently exemplary types of network adapters.

Although exemplary embodiments of the present invention have been described in detail, it should be understood that various changes, substitutions and alternations can be made therein without departing from spirit and scope of the inventions as defined by the appended claims. Variations described for exemplary embodiments of the present invention can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the present invention.

While exemplary embodiments of the present invention have been described, it will be understood that those skilled in the art, both now and in the future, may make various modifications without departing from the spirit and the scope of the present invention as set forth in the following claims. These following claims should be construed to maintain the proper protection for the present invention.

What is claimed is:

1. A method for implementing data-driven quality of service (QoS) control in design and development of a service oriented architecture (SOA) solution, the method comprising:
    implementing a QoS layer having a first set of architectural building blocks (ABBs) and configured to specify a QoS requirement definition to be propagated through a set of components of the SOA solution to generate QoS data for controlling and managing QoS in a unified form;
    implementing a data architecture layer having a second set of ABBs and configured to facilitate propagation of generated QoS data through the set of components in the SOA solution; and
    integrating the QoS layer with each of an operational system layer, a service component layer, a service layer, a business process layer, a consumer layer, an integration layer, the data architecture layer, and a governance layer in the SOA solution.

2. The method of claim 1, wherein the QoS requirement definition comprises an extensible cluster of QoS attributes.

3. The method of claim 2, wherein the cluster of QoS attributes includes reliability, security, safety, and availability.

4. The method of claim 3, wherein the QoS requirement definition specifies that the QoS data for each component is generated by examining the cluster of QoS attributes in view of a set of contextual parameters for the component.

5. The method of claim 4, wherein the set of components include a business process layer, a business protocol layer, a business construct layer, a business primitive layer, a message layer, and a data entity layer.

6. The method of claim 5, wherein the set of contextual parameters for each component is based upon one or more relationships between a set of elements within the SOA solution.

7. The method of claim 6, wherein the set of elements include one or more business entity elements, one or more business service elements, one or more Web service elements, and one or more operation elements.

8. The method of claim 1, wherein the unified form for QoS data is defined according to web services resource framework (WSRF).

9. The method of claim 1, wherein the first set of ABBs include a secure quality of service (s-QoS) manager ABB, a representation ABB, a capability manager ABB, an s-QoS context ABB, an s-QoS enablement ABB, an s-level instance manager ABB, a life cycle manager ABB, a delivery time ABB, an execution cost ABB, a delivery environment ABB, a relationship ABB, an s-QoS content ABB, a reliability ABB, an availability ABB, a security ABB, and a safety ABB.

10. The method of claim 1, wherein the second set of ABBs include a data services gateway ABB, a data aggregator ABB, a data mining ABB, a access control ABB, a traceability ABB, a data representation ABB, and a data sources ABB.

11. A non-transitory computer-usable medium having computer readable instructions stored thereon for execution by a processor to perform a method for implementing data-driven quality of service (QoS) control in design and development of a service oriented architecture (SOA) solution, the method comprising:
    implementing a QoS layer having a first set of architectural building blocks (ABBs) and configured to specify a QoS requirement definition to be propagated through a set of components of the SOA solution to generate QoS data for controlling and managing QoS in a unified form;
    implementing a data architecture layer having a second set of ABBs and configured to facilitate propagation of generated QoS data through the set of components in the SOA solution; and
    integrating the QoS layer with each of an operational system layer, a service component layer, a service layer, a business process layer, a consumer layer, an integration layer, the data architecture layer, and a governance layer in the SOA solution.

12. A data processing system comprising:
    a central processing unit;
    a random access memory for storing data and programs for execution by the central processing unit;
    a first storage level comprising a nonvolatile storage device; and
    computer readable instructions stored in the random access memory for execution by central processing unit to perform a method for designing and developing a service oriented architecture (SOA) solution, the method comprising:
    implementing a quality of service (QoS) layer having a first set of architectural building blocks (ABBs) and configured to specify a QoS requirement definition to be propagated through a set of components of the SOA solution to generate QoS data for controlling and managing QoS in a unified form;
    implementing a data architecture layer having a second set of ABBs and configured to facilitate propagation of generated QoS data through the set of components in the SOA solution; and
    integrating the QoS layer with each of an operational system layer, a service component layer, a service layer, a business process layer, a consumer layer, an integration layer, the data architecture layer, and a governance layer in the SOA solution.

* * * * *